United States Patent [19]

Bazin

[11] 4,069,432
[45] Jan. 17, 1978

[54] SIGNAL COMPARATOR CIRCUIT

[75] Inventor: Lucas John Bazin, Stratford, N.J.

[73] Assignee: RCA Corporation, New York, N.Y.

[21] Appl. No.: 693,823

[22] Filed: June 7, 1976

Related U.S. Application Data

[62] Division of Ser. No. 563,684, March 31, 1975.

[51] Int. Cl.² .............................................. H03K 5/20
[52] U.S. Cl. ................................... 307/357; 307/364;
328/147; 358/27
[58] Field of Search ........... 307/235 F, 235 G, 235 V,
307/357, 355, 364; 358/27; 328/146, 147

[56] References Cited

U.S. PATENT DOCUMENTS

| | | | |
|---|---|---|---|
| 3,237,025 | 2/1966 | Clapper | 307/235 F |
| 3,758,867 | 9/1973 | Schulz | 307/235 G |
| 3,965,388 | 6/1976 | Brisk | 307/235 F |

Primary Examiner—John S. Heyman
Attorney, Agent, or Firm—E. M. Whitacre; M. DeCamillis

[57] ABSTRACT

A plurality of comparators are used to compare first, second, and third input signals against a first and second predetermined signal level threshold. The outputs of the comparators are combined to ascertain the difference in signal amplitude between the first, second, and third input signals with respect to the first and second predetermined signal thresholds. If the amplitude deviation of the first, second, and third signals are within the threshold limits, a control signal adjusts the characteristics of the first and second signal channels to match the amplitude of the first and second signals to the amplitude of the third signal to make the three input signals equal. If the first, second, and third input signal deviation is without the threshold limits, the input signals are assumed correct, and no adjustment is made.

4 Claims, 3 Drawing Figures

SIGNAL COMPARATOR CIRCUIT

This is a division of application Ser. No. 563,684, filed Mar. 31, 1975.

The present invention relates to signal comparator circuits and, in particular, to apparatus for automatic gamma control of color signals generated by a television film camera wherein the relative amplitude of the color signals are adjusted.

Automatic color balancing has been used to adjust the black level balance and gains of the red and blue signals relative to those of the green signals to provide white level balance in the processing amplifier following a television camera.

However, such a system does not necessarily provide the desired color signal balance intermediate the levels established for black, which represents a lack of color information, and white which represents equal amounts of color information. A lack of compensation in the area of color information intermediate the established black and white levels is particularly troublesome in the instances where the video signals are derived from motion picture film which suffers a color defect due to improper processing or as more commonly observed, the normal aging of a previously recorded film.

Since a typical scene contains a significant amount of detail which is reproduced only as shades of brightness, it is necessary to have equal amounts of all three primary color signals to represent white and various shades of grey scale throughout the picture. The loss of diminishing of one of the primary colors results in a shift of the white or grey areas of the scene content toward the remaining predominant colors and the reproduced picture appears with an overall color cast.

The concept of a color correction signal comparator circuit on which the present invention is based is that colors close to grey are assumed to be grey and can be made grey without seriously affecting a good color picture. The invention utilizes the availability of the red, green and blue signals in a color television camera as first, second, and third input signals to provide the necessary color signal samples to a signal comparator circuit to adjust the colored grey scale. In a properly operating color television camera, a grey scale represents equal amounts of video signals in each of the red, green and blue channels intermediate the black and white levels. A detector samples the first, second, and third signal levels available in the respective channels and when the three signals are within a predetermined level of each other, an error correcting signal is applied to the appropriate gamma circuit to balance the three signal levels so as to produce a grey signal.

In accordance with the present invention, a logic circuit is provided for determining when all of a plurality of signals are within a predetermined amplitude range. The logic circuit comprises first comparing means for developing a first output signal when all of the signals are above an upper predetermined amplitude. Second comparing means for developing a second output signal when all of the signals are below a lower predetermined amplitude, and third comparing means coupled to the first and second comparing means for developing a third output signal in response to coincidence of the first and second output signals.

The present invention will be better understood by reference to the accompanying drawings and specification in which.

Figure 1:
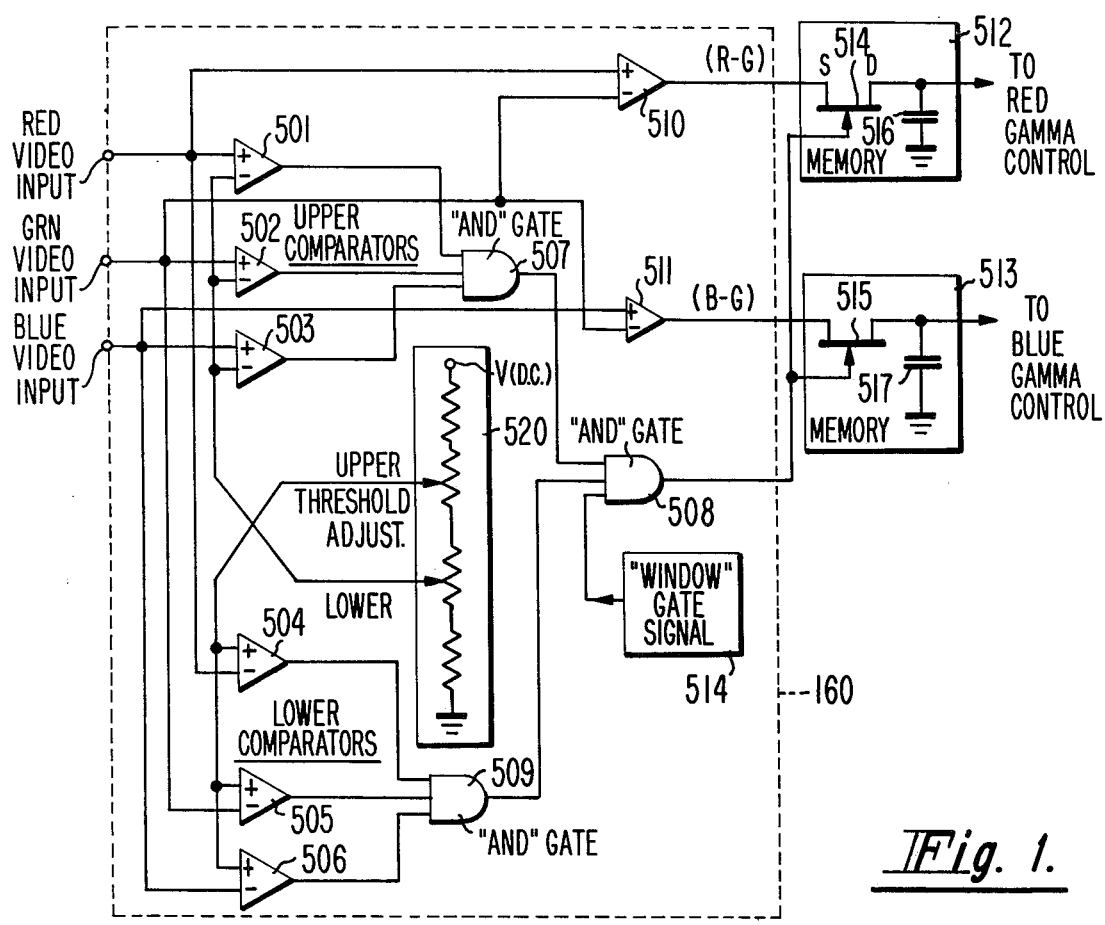
FIG. 1 is a block diagram of a detector embodying the present invention.

In FIG. 1, input signals shown as red (R), green (G) and blue (B) video signals are applied respectively to comparators 501, 502, 503 which provide increased output in response to signals above a predetermined threshold and are therefore termed upper comparators. Simultaneously, the same R, G and B color signals are applied respectively to comparators 503, 504 and 506 which provide increased output in response to signals below a second different threshold, and are therefore called lower comparators. A reference source 520 comprising a voltage divider with respective upper and lower threshold voltage taps is coupled to the respective upper and lower comparators to provide a predetermined level against which the applied R, G, B signals are compared.

When a video signal exceeds the predetermined lower threshold signal level, the output of the upper comparators 501, 502, 503 responds with a logic 1 and when the video signal does not exceed the predetermined signal level, the comparators respond with a logic 0. Similarly, when a color signal exceeds the predetermined upper threshold signal level, the output of the lower comparators 504, 505, 506 respond with a logic 0 and when the color signal does not exceed the predetermined signal level, the comparators respond with a logic 1.

The outputs of the upper comparators 501, 502, 503 represented by a logic 1 or logic 0 are coupled to AND gate 507. The output of AND gate 507 is a logic 1 only when all of the inputs representing upper comparators 501, 502, 503 are logic 1.

The outputs of lower comparators 504, 505, 506 represented by a logic 1 or logic 0 are coupled to AND gate 509. The output of AND gate 509 is a logic 1 only when all of the inputs representing lower comparators 504, 505, 506 are logic 1.

The outputs of AND gates 507, 509 and a gating signal 514 are coupled to AND gate 508 so that AND gate 508 provides an output represented as logic 1 only when both inputs from AND gates 507 and 509 are at logic 1 and the gate signal is present.

The R and G signals are applied to a differential amplifier 510 to develop a difference signal R-G which is applied to memory circuit 512.

Similarly, the B and G signals are applied to a differential amplifier 511 to develop a difference signal G-Y which is applied to a memory circuit 513.

Memories 512 and 513 each comprise a field effect transistor (FET) 514, 515 and capacitors 516, 517 respectively. The capacitors 516 and 517 are each high quality polystyrene capacitors capable of retaining a charge on themselves for hours at a time. Together with FET's 514 and 515, capacitors 516 and 517 form sample and hold memory circuits.

The output of AND gate 508 in the form of a logic 1 serves to close the FET switches in memories 512 and 513 to sample the R-G and B-G signals respectively only if an input corresponding to a logic 1 output from both the AND gates 507 and 509 is present during the gating signal applied to AND gate 508. The outputs of the memories 512 and 513 are coupled to the adjustable gain (gamma) circuits to provide the control signal for controlling the grey scale gamma of the red and blue color input signals respectively relative to the reference green color input signal over the entire dynamic range of the applied signals.

Figures 2, 3:
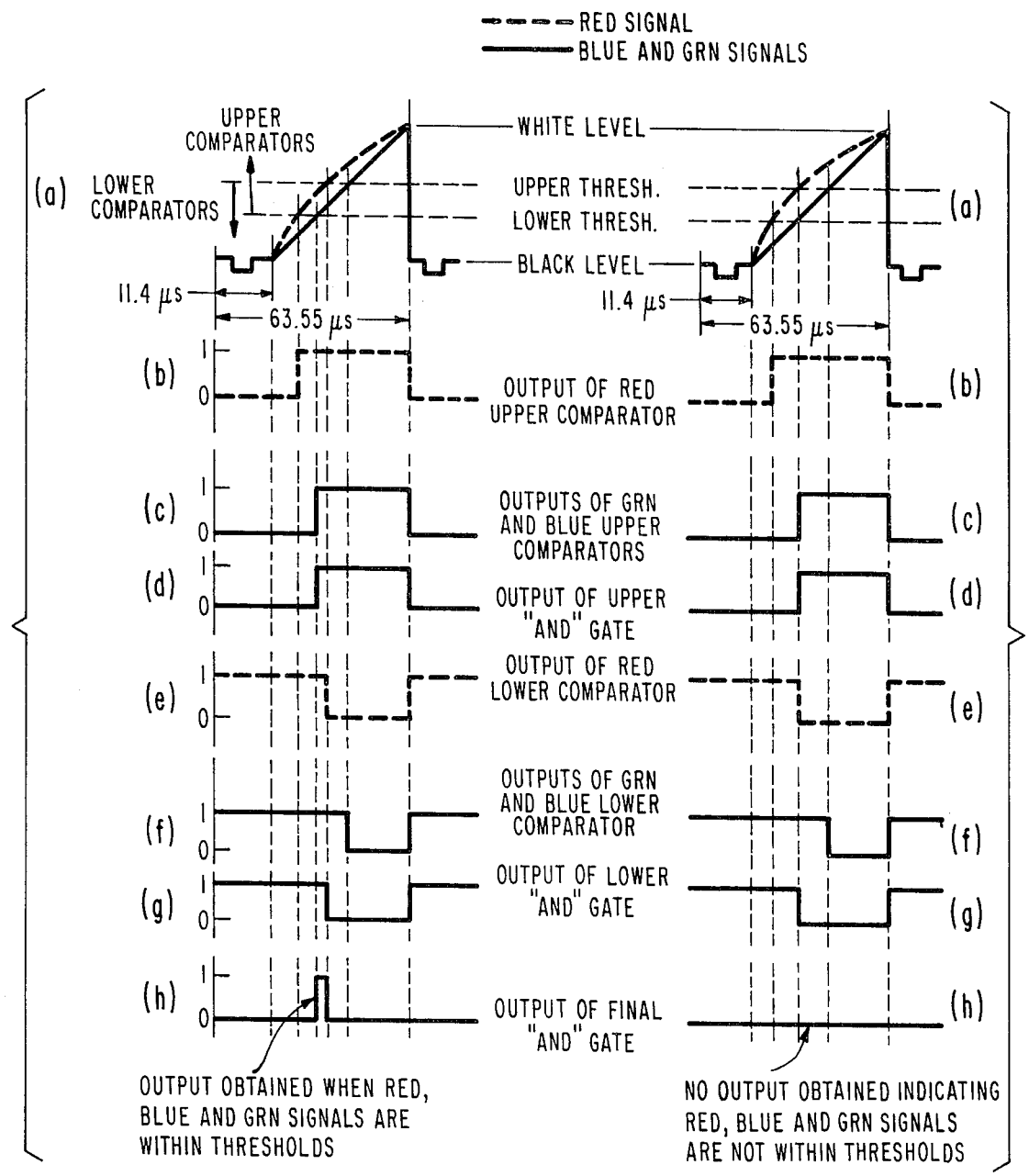
FIGS. 2 and 3 are waveforms depicting the operation of the apparatus of FIG. 1.

The operation of the circuitry of FIG. 1 can be better understood with reference to FIG. 2 which illustrates differences in the red, green and blue color signals within the predetermined threshold level and in FIG. 3 differences in red, green and blue color signals which occur outside the predetermined threshold level. In FIGS. 2 and 3 waveforms 2a and 2b illustrate a video waveform with a time base representing a single horizontal line of a television picture frame with a duration of 63.55 microseconds in accordance with NTSC standards. The amplitude of waveforms 2a and 2b illustrate a video signal which varies uniformly from black at the beginning of the active picture time following the blanking interval to white at the end of the active picture time preceding the next blanking interval. The R, G, B video signal levels for black level and white level are presumed to be established either by means of the apparatus, not shown. Typical values for black level and white reference levels are 5% and 95%, respectively. By means of upper and lower threshold adjustment 520, voltages corresponding to 45% and 55% of full scale are selected as predetermined thresholds for grey. It will be noted, as previously discussed, that a lack of video signal information represents black level, an equal amount of R, G, B, video signal information at full scale represents white and equal amounts of R, G, and B video signal information at an amplitude of 50% represents grey. FIG. 2 illustrates the operation of the system when only the red color signal shown in waveform 2 is different in value from the blue and green signals but within the threshold limits established by the upper and lower comparators in conjunction with reference 520. Outputs from each of the upper R, G, and B comparators shown as waveforms 2b, 2c are summed in the upper AND gate 507, while the outputs of each of the lower R, G, B comparators shown as waveforms 2e and 2f are summed in the lower AND gate 508. The outputs of upper AND gate 507 shown as waveform 2d and of lower AND gate 508 shown as waveform 2e are summed in AND gate 508, resulting in output waveform 2h from AND gate 508 which enables sample and hold memories 512 and 513 to establish control values responsive to the difference signal R-G from difference amplifier 510 and B-G from difference amplifier 511. The control values established at memories 512 and 513 respectively are coupled to the red and blue channel gamma control to change the transfer characteristic of the gamma circuit to correct the red and blue color signals to a level equivalent to the reference green color signal over the entire dynamic range of the applied signals thereby producing grey.

Similarly, in FIG. 3 a red color signal deviating from the blue and green color signals, is shown in waveform 3a; however, as illustrated in waveforms 3b, 3c, 3e, 3f and their summation in AND gate input waveforms 3d and 3g, the resultant output waveform from AND gate 508 indicates the red color signal is outside the selected threshold limit. AND gate 508 does not provide a signal in this instance to enable sample and hold memories 512 and 513 to establish new control values responsive to the R-G and B-G difference signals, since by definition if a color signal exceeds the selected upper and lower thresholds (i.e., not within the "window"), it is assumed that the color belongs in the overall picture and it is not desirable to make it equivalent to grey.

As noted in conjunction with FIG. 1, final AND gate 508 has as its input a gating signal which is required in addition to a logic 1 from AND gates 507, 509 for an output to be provided at gate 508. In the illustrated embodiments, a "wide gate signal" in the form of a logic 1 derived from the horizontal and vertical line frequency is used in addition to a logic 1 from AND gates 507, 509 to enable a logic 1 at the output of gate 508 during approximately 90% of the active picture area to prevent shading and edge transient phenomena during edge portions of the picture from initiating gamma correction. In summary, input signals in the form of the red, green and blue color signals are compared during the active picture area at selected grey scale values and when their deviation is small or close to grey, the red and blue grey scale gamma transfer characteristic is matched to the green grey scale gamma characteristic to produce grey. If the red, blue and green deviation is larger than the established threshold, the color signal is presumed to be a correct color and a correction to grey is not made.

What is claimed is:

1. A logic circuit for determining when all of a plurality of signals are within a predetermined amplitude range comprising:
   first comparing means for developing a first output signal when all of said signals are above an upper predetermined amplitude, saaid first comparing means including:
   first, second and third comparators;
   threshold voltage means corresponding to one limit of said amplitude range coupled to each of said first, second and third comparators;
   means coupling a different one of said signals to each of said first, second and third comparators, each of said comparators being operative to produce a first logic state when the signal applied thereto exceeds said one limit and a second logic state when the signal applied thereto is less than said one limit;
   second comparing means for developing a second output signal when all of said signals are below a lower predetermined amplitude;
   said second comparing means including:
   fourth, fifth and sixth comparators;
   threshold voltage means corresponding to another limit of said amplitude range coupled to each of said fourth, fifth and sixth comparators;
   means coupling a different one of said signals to each of said fourth, fifth and sixth comparators, each of said comparators being operative to produce said second logic state when the signal applied thereto exceeds said other limit and said first logic state when the signal applied thereto is less than said one limit;
   third comparing means coupled to said first and second comparing means for developing a third output signal in response to coincidence of said first and second output signals;
   said third comparing means including:
   a first AND gate coupled to said first, second and third comparators;
   a second AND gate coupled to said fourth, fifth and sixth comparators;
   a thrid AND gate coupled to said first and second AND gates to produce said first logic state when all of said signals are within said predetermined amplitude range.

2. A logic circuit according to claim 1 wherein said first logic state equals a 1 and said second logic state equals a 0.

3. A logic circuit according to claim 1 wherein said first logic state equals a 0 and said second logic state equals a 1.

4. A logic circuit according to claim 1 wherein said third AND gate has coupled thereto a third control signal having said first and second logic state to provide a further control of the logic state output of said third AND gate.

* * * * *